United States Patent
Marri Sridhar et al.

(10) Patent No.: US 9,935,756 B2
(45) Date of Patent: Apr. 3, 2018

(54) METHODS AND SYSTEMS FOR RANGING PROTOCOL

(71) Applicant: QUALCOMM Incorporated, San Diego, CA (US)

(72) Inventors: Subash Marri Sridhar, San Jose, CA (US); Carlos Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 14/845,893

(22) Filed: Sep. 4, 2015

(65) Prior Publication Data

US 2016/0241373 A1    Aug. 18, 2016

Related U.S. Application Data

(60) Provisional application No. 62/117,407, filed on Feb. 17, 2015.

(51) Int. Cl.
| | |
|---|---|
| *H04L 5/00* | (2006.01) |
| *H04W 24/10* | (2009.01) |
| *H04W 72/04* | (2009.01) |
| *G01S 5/14* | (2006.01) |
| *H04W 64/00* | (2009.01) |
| *G01S 13/76* | (2006.01) |

(52) U.S. Cl.
CPC .............. *H04L 5/0055* (2013.01); *G01S 5/14* (2013.01); *G01S 13/767* (2013.01); *H04W 24/10* (2013.01); *H04W 64/00* (2013.01); *H04W 72/044* (2013.01)

(58) Field of Classification Search
CPC ..... H04L 5/0055; H04L 43/0864; H04L 1/16; H04W 24/10
See application file for complete search history.

(56) References Cited

U.S. PATENT DOCUMENTS

| | | | |
|---|---|---|---|
| 2014/0187259 A1 | 7/2014 | Kakani | |
| 2014/0295877 A1* | 10/2014 | Hart | H04W 4/02 455/456.1 |

(Continued)

OTHER PUBLICATIONS

Aldana C, (QUALCOMM) : "Location Related Corrections to Draft 3.0 ; 11-14-0933-02-000m-location-related-correc tions-to-draft-3-0," IEEE Draft; 11-14-0933-02-000M-LOCATION-RELATED-CORREC TIONS-TO-DRAFT-3-0, IEEE-SA Mentor, Piscataway, NJ USA, vol. 802.11m, No. 2, Jul. 17, 2014 (Jul. 17, 2014), pp. 1-16, XP068070652, [retrieved on Jul. 17, 2014].

(Continued)

*Primary Examiner* — Shukri Taha
(74) *Attorney, Agent, or Firm* — Berkeley Law & Technology Group, LLP

(57) ABSTRACT

Disclosed are methods and systems for obtaining measurements of a range between devices in an exchange messages. In particular, described are techniques for transmitting messages between or among devices to share computed parameters indicative of ranges between devices. In particular implementations, shared computed parameters indicative of ranges between or among devices may enable computation of estimated locations of one or more of devices.

30 Claims, 7 Drawing Sheets

(56) References Cited

U.S. PATENT DOCUMENTS

2014/0335885 A1* 11/2014 Steiner .................. H04W 64/00
                                                       455/456.1
2015/0257028 A1*  9/2015 Chu ....................... G01S 13/74
                                                       370/252
2015/0319631 A1  11/2015 Aldana
2015/0365913 A1  12/2015 Aldana
2016/0080960 A1   3/2016 Aldana
2016/0366548 A1* 12/2016 Wang .................... H04W 64/00

OTHER PUBLICATIONS

International Search Report and Written Opinion—PCT/US2016/013761—ISA/EPO—dated Apr. 20, 2016.
"Proposed Resolution for Revmc—CID 2164 11-14-0160-00-000m-proposed-resolution-for-revmc-cid-2164," IEEE Draft; 11-14-0160-00-000M-PROPOSED-RESOLUTION-FOR-REVMC-CID-2164, IEEE-SA Mentor, Piscataway, NJ USA, vol. 802.11m, Jan. 22, 2014 (Jan. 22, 2014) , pp. 1-12, XP068063729, [retrieved on Jan. 22, 2014.

* cited by examiner

FIG. 6

| Category | Public Action | Trigger | LCI Measurement Request (optional) | Location Civic Measurement Request (optional) | Fine Timing Measurement Parameters (optional) |
|---|---|---|---|---|---|
| 1 | 1 | 1 | variable | variable | variable |

Octets:

FIG. 7

| Status Indication | Value | Burst Offset Enable | Number of Bursts Exponent | Burst Duration | Min Delta FTM | Burst Offset |
|---|---|---|---|---|---|---|
| 2 | 5 | 1 | 4 | 4 | 8 | 16 |

B0  B1 B2  B6  B7  B8  B11 B12  B15 B16  B23 B24  B39

| ASAP Capable | ASAP | FTMs per Burst | Reserved | FTM Format and Bandwidth | Reserved | Burst Period |
|---|---|---|---|---|---|---|
| 1 | 1 | 5 | 2 | 6 | 1 | 16 |

B40  B41  B42  B43  B47 B48  B49 B50  B55 B56  B71

Bits:

Octets:

METHODS AND SYSTEMS FOR RANGING PROTOCOL

CROSS-REFERENCE TO RELATED APPLICATION

This application claims the benefit of U.S. Provisional Application No. 62/117,407, entitled "Methods and Systems for Ranging Protocol," filed Feb. 17, 2015, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

BRIEF DESCRIPTION OF THE DRAWINGS

Non-limiting and non-exhaustive aspects are described with reference to the following figures, wherein like reference numerals refer to like parts throughout the various figures unless otherwise specified.

FIG. 6 is a diagram showing fields in a fine timing measurement (FTM) request message according to an embodiment.

FIG. 7 is a diagram showing fields in an FTM request message according to an embodiment.

SUMMARY

Figure 1:
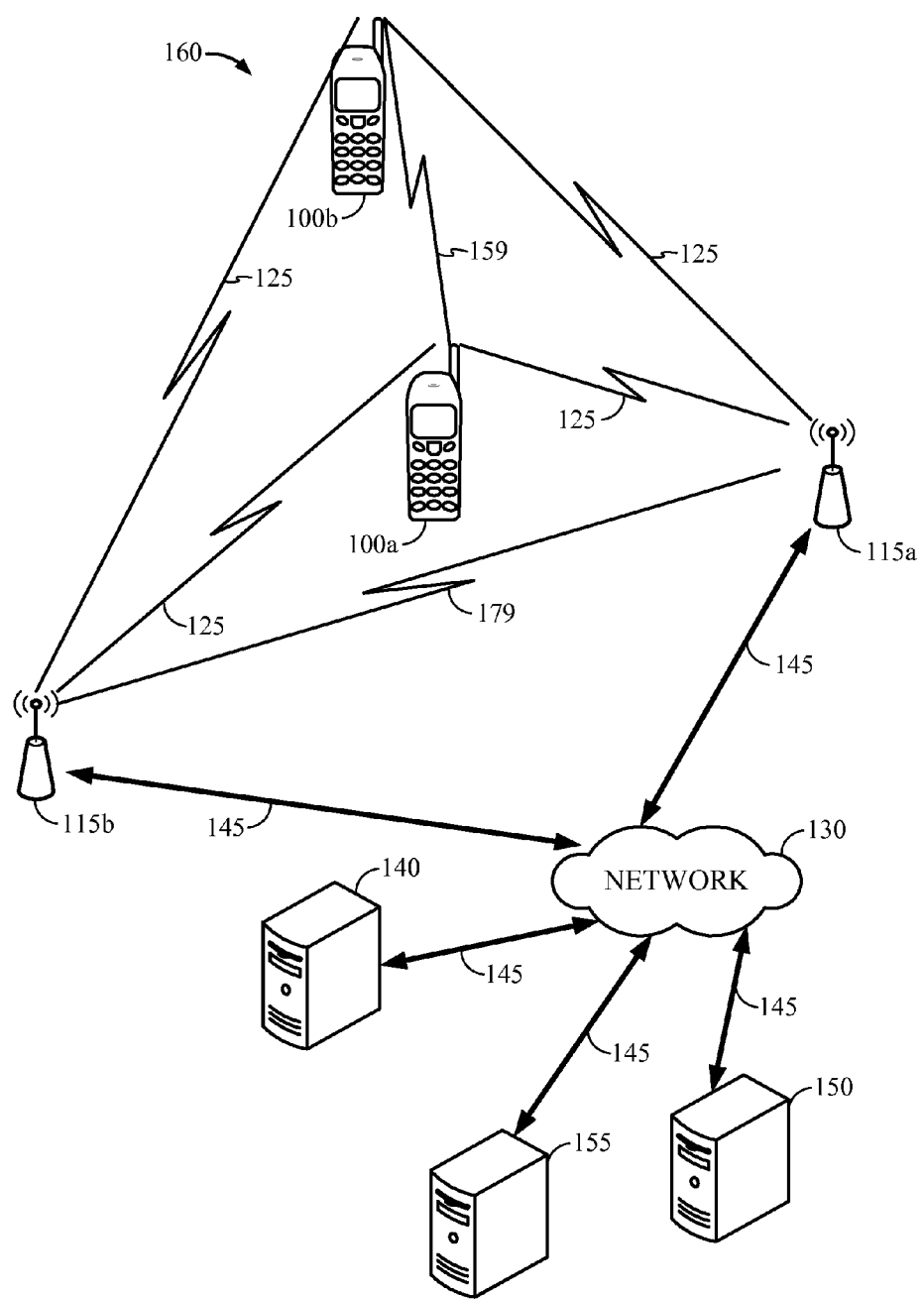
FIG. 1 is a system diagram illustrating certain features of a system containing a mobile device, in accordance with an implementation.

Briefly, particular implementations are directed to a method at an initiating wireless station (STA) comprising: transmitting a first fine timing measurement (FTM) request message requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages; and receiving the initial FTM message transmitted by the responding STA in response to the first FTM request message.

Another particular implementation is directed to an initiating wireless station (STA), comprising: a receiver to receive messages from a wireless communication network; a transmitter to transmit messages to the wireless communication network; and one or more processors configured to: initiate transmission of a first fine timing measurement (FTM) request message through the transmitter requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages; and obtain the initial FTM message transmitted by the responding STA in response to the first FTM request message received at the receiver.

Another particular implementation is directed to a method comprising, at a responding wireless station (STA): receiving a first fine timing measurement (FTM) request message from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages; and transmitting the initial FTM message in response to the first FTM request message.

Another particular implementation is directed to a responding wireless station (STA), comprising: a receiver to receive messages from a wireless communication network; a transmitter to transmit messages to the wireless communication network; and one or more processors configured to: obtain a first fine timing measurement (FTM) request message received at the receiver from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages; and initiate transmission of the initial FTM message through the transmitter in response to the first FTM request message.

Another particular implementation is directed to a non-transitory storage medium comprising computer readable instructions stored thereon which are executable by one or more processors of an initiating wireless station (STA) to: initiate transmission of a first fine timing measurement (FTM) request message requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages; and obtaining the initial FTM message received at the initiating STA and transmitted by the responding STA in response to the first FTM request message.

Another particular implementation is directed to an initiating wireless station (STA) comprising: means for transmitting a first fine timing measurement (FTM) request message requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages; and means for receiving the initial FTM message transmitted by the responding STA in response to the first FTM request message.

Another particular implementation is directed to a non-transitory storage medium comprising computer readable instructions stored thereon which are executable by one or more processors at a responding wireless station (STA) to: obtain a first fine timing measurement (FTM) request message received from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages; and initiate transmission of the initial FTM message in response to the first FTM request message.

Another particular implementation is directed to a responding wireless station (STA), comprising: means for receiving a first fine timing measurement (FTM) request message from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages; and means for transmitting the initial FTM message in response to the first FTM request message.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a round trip time (RTT) in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining RTT measurements with sufficient accuracy for measuring a range between the wireless STAs using fewer messages, for example. Such a measured range may be used in any one of several applications including positioning operations, for example.

As discussed below, a first STA may transmit a fine timing measurement (FTM) request message to a second STA to initiate a process for an exchange of messages or frames enabling the first STA to obtain an RTT measurement. In a particular implementation, the fine timing measurement request message may include an indication as to whether the first STA is capable of sharing ranging measurements or other parameters indicative of range. In a particular implementation, subsequent to computation of an RTT measurement, the first STA may transmit one or more messages to the second STA comprising a computed range or RTT measurement or other parameter indicative of range. It should be understood that this is merely an example implementation and that claimed subject matter is not limited in this respect.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a time of flight (TOF) for the transmission of a message between STAs using fewer messages than typical techniques used for measuring RTT. According to an embodiment, TOF may be measured for individual messages in a "burst" of messages transmitted close in a sequence. Combining multiple TOF measurements from a burst of received messages may enable reduction in measurement errors, for example.

In particular implementations, a time stamp in a message transmitted from a first STA to a second STA may enable the second STA to measure TOF of the message if the first and second STAs maintain synchronized clocks. In one example, a Timing Synchronization Function (TSF) specified in IEEE std. 802.11 wireless local area network (WLAN) may enable timing synchronization among devices in a wireless communication network. A TSF may keep timers for multiple devices in the same Basic Service Set (BSS) synchronized. STAs may maintain a local TSF timer. In one implementation, timing synchronization may be achieved by STAs periodically exchanging timing information through beacon frames. A STA in an Independent Basic Service Set (IBSS) may adopt a received timing if it is later than the STA's own TSF timer. In another implementation, STAs may perform a probe request/probe response transaction to exchange TSF timer values. These techniques to synchronize STAs by an exchange TSF timer values, however, contributes to power consumption and latency in obtaining a TOF measurement.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, a mobile device 100 or local transceiver 115 may be capable of computing a position fix based, at least in part, on signals acquired from local transmitters (e.g., WLAN access points positioned at known locations). For example, a receiver device (e.g., a mobile device 100 or local transceiver 115) may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, a mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver, between two peer mobile devices, or between two stationary transceivers, just to provide a few examples. In particular implementations, various techniques described herein may incorporate some, but not necessarily all, aspects or features of IEEE P802.11-REVmc™/D4.0 Draft Standard 802.11 for Information technology—Telecommunications and information exchange between systems, Local and metropolitan area networks—Specific requirements Part 11: Wireless LAN Medium Access Control (MAC) and Physical Layer (PHY), January 2015, section 10.24.6 (hereinafter "IEEE std. 802.11"). Indeed, it should be understood that some features described herein are not shown, described or taught in the IEEE std. 802.11.

Figure 2:
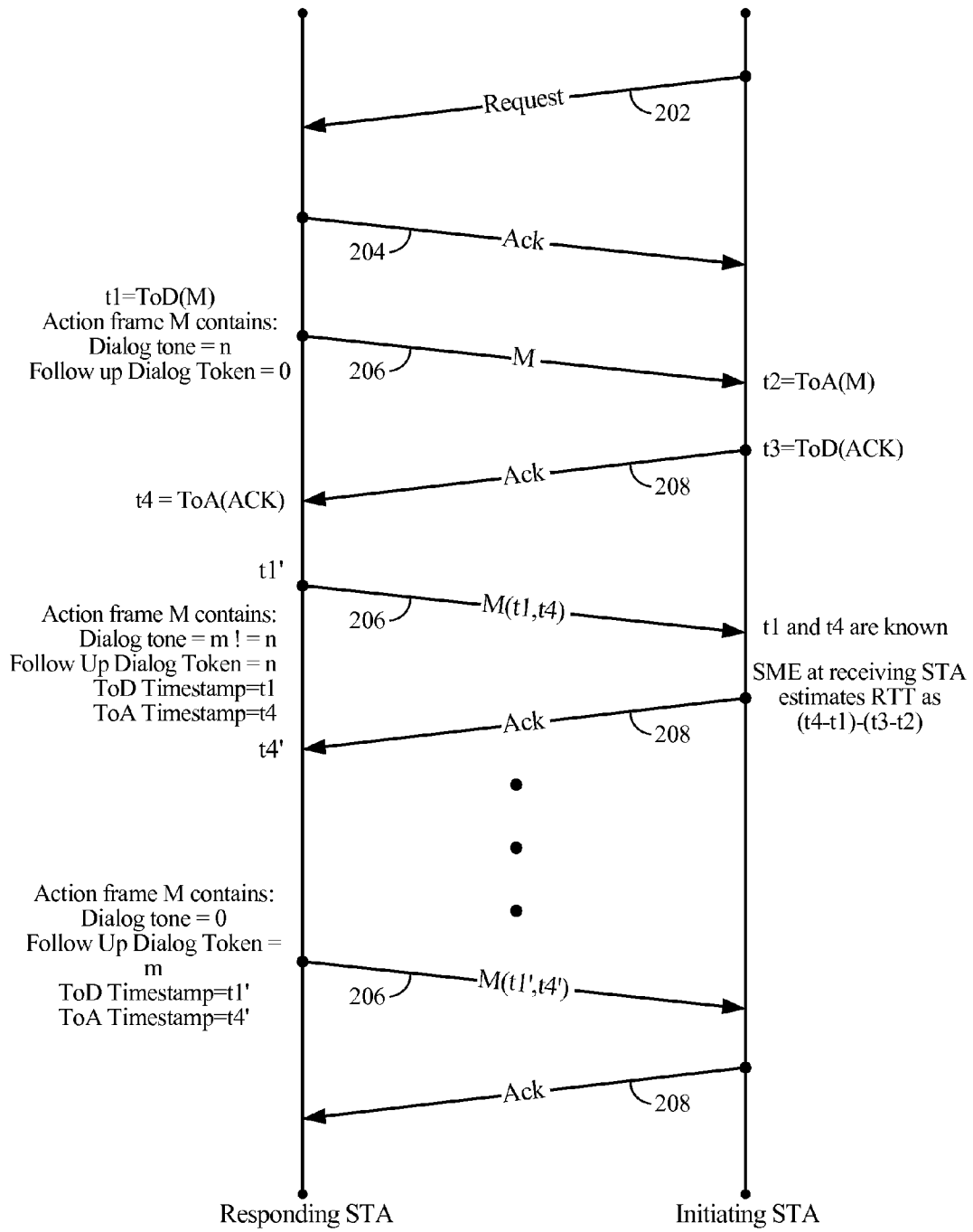
FIGS. 2 and 3 are diagrams illustrating message flows between wireless stations (STAs) according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11 at section 8.6.8.25. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2, t3 and t4).

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more FTM messages including measurements or parameters enabling the initiating STA to compute RTT or other parameters indicative of range.

In a particular implementation, while not limiting claimed subject matter in this respect, contents of such a fine timing measurement message or frame may be as shown in the IEEE std. 802.11 at section 8.6.8.33. In one example implementation, an initiating STA may compute an RTT measurement as (t4−t1)−(t3−t2), where t2 and t3 are the time of receipt of a previous fine timing measurement message or frame and transmission of a preceding acknowledgement message or frame, respectively. The initiating STA may transmit a series of fine timing measurement request messages in a burst to obtain a corresponding number of RTT measurements which may be combined for cancellation of unbiased measurement noise in computing a range between the receiving and responding STAs.

FTM request messages and FTM messages may transmitted by STAs in addition to frames or messages for other services (e.g., for Internet Protocol messaging). In dense wireless traffic scenarios such as airport terminals or stadium events, transmission of FTM request messages and FTM messages for the computation of RTT may stress available messaging capacity at a STA. Particular implementations discussed herein may be directed to an exchange of messages for obtaining measurements for computation of range between STAs using the transmission of fewer messages by a STA.

As discussed below, an initiating STA and a responding STA may be synchronized to enable the initiating STA to accurately measure of a time of flight (TOF) of an FTM measurement message transmitted from the responding STT to the initiating STA. In a particular implementation, the initiating STA and responding STA may maintain clock signals that are synchronized to one another. For example, the initiating and/or responding STA may be capable of converting between time as maintained at the initiating STA and time as maintained at the responding STA. Clocks maintained at the initiating and responding STAs may be synchronized using any of one of several techniques such as those provided or suggested by IEEE std. 802.11 REVmc Draft 4.0, section 10.24.5 or IEEE std. 802.11 REVmc Draft 3.0, section 10.24.6. It should be understood, however, that this is merely an example of techniques that may be applied in synchronizing an initiating STA with a responding STA, and claimed subject matter is not limited in this respect.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF based on a different between the time stamp value and an instance that the particular symbol is decoded or detected.

Figure 3:
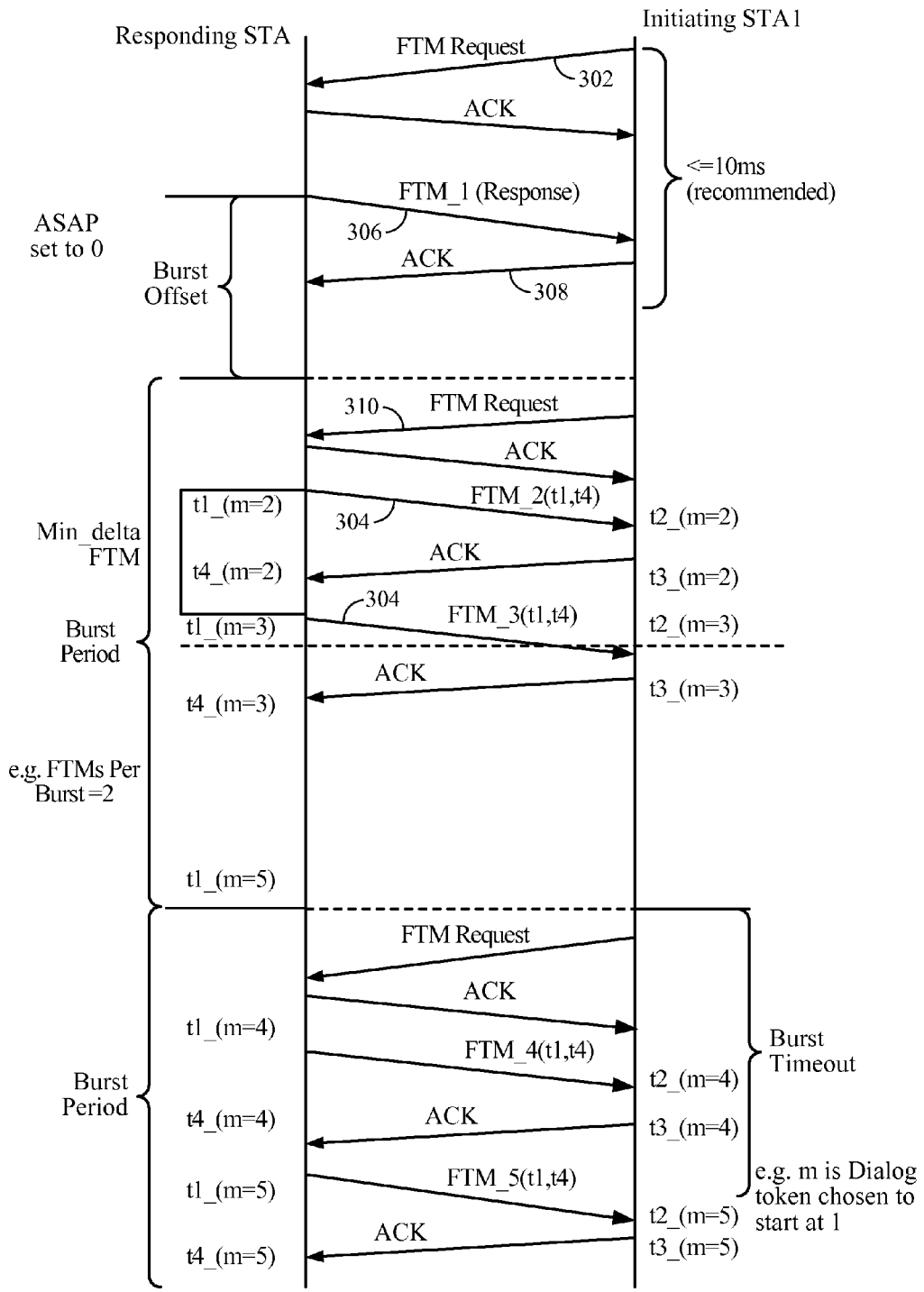

FIG. 3 is a message flow diagram illustrating a technique for measuring a TOF of FTM messages transmitted by a responding STA and received at a receiving STA. Initially, an initiating STA may transmit a first FTM request message 302 to a responding STA including several fields to, among other things, request transmission of one or more subsequent FTM messages from the responding STA. In the particular illustrated example, an initial FTM request message 302 may request a burst of subsequent FTM messages 304 following a time period. An initial FTM message FTM_1 306 (e.g., as set forth in IEEE std. 802.11 REVmc Draft 4.0 at sections 10.24.6.4 or 8.6.6.33) following the initial FTM request message 302 may specify particular actions scheduled by the responding STA to meet a request in the initial FTM request message 302. For example, initial FTM message FTM_1 306 may specify alternative action if the responding STA is not capable of fulfilling the entirety of what the initiating STA requests in the initial FTM request message 302.

According to an embodiment, a responding STA may retransmit an initial FTM message FTM_1 306 in the absence of receiving an acknowledgement message from a recipient initiating STA (e.g., an initiating STA transmitting an initial FTM request message). For example, following transmission of an initial FTM message FTM_1 306, a responding STA may wait a set timeout period for receipt of an acknowledgement message 308 from an initiating STA. In in the absence of receipt of such an acknowledgement message 308 from an initiating STA, the responding STA may retransmit the initial FTM message FTM_1 306. This may continue until the responding STA receives an acknowledgement message 308 transmitted from an initiating STA in response to an initial FTM message FTM_1 306 or until a set number (e.g., sixteen) of retransmissions of the initial FTM message FTM_1 306. Following transmission of FTM messages 304 and/or transmission of FTM messages in subsequent bursts of FTM messages, an initiating STA may compute TOF, for example.

Figure 4:
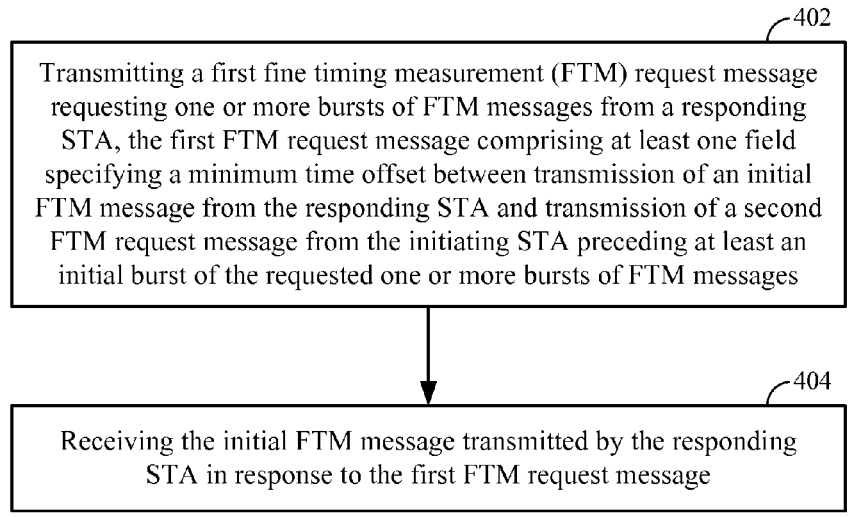
FIGS. 4 and 5 are flow diagrams of processes performed by STAs in connection with an exchange of messages according to particular embodiments.
Figure 5:
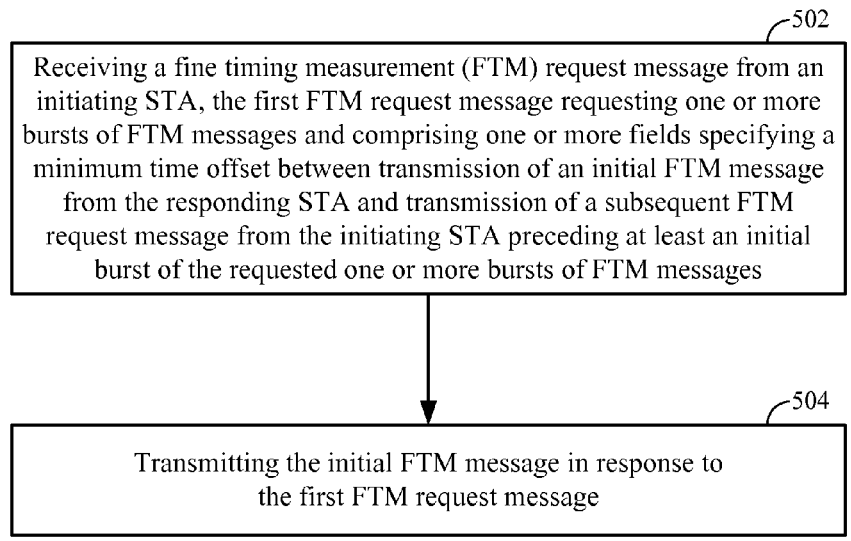

FIGS. 4 and 5 are flow diagrams illustrating processes that may be executed at an initiating STA or responding STA, respectively. At block 402, an initiating STA may transmit a first FTM request message, such as FTM request message 302, requesting one or more bursts of FTM messages from a responding STA. The first FTM request message transmitted at block 402 may comprise at least one field specifying a minimum time offset between transmission of an initial FTM message from the responding STA and transmission of a second FTM request message, such as FTM request message 310, from the initiating STA preceding at least an initial burst of the requested one or more bursts of FTM messages, such as FTM messages 304. At block 404, the initiating STA may receive an initial FTM message, such as FTM message FTM_1 306, in response to the first FTM request message A minimum time offset in block 402 may be illustrated by non-limiting example in FIG. 3 as a duration "Burst Offset" between time of transmission of FTM message FTM_1 306 and time of transmission of FTM request message 310. In this context, a "minimum time offset" is a duration of time that does not have a predetermined beginning or end. Minimum time offset defines a minimum time following a particular referenced event, such as a time of transmission of FTM message FTM_1 306 in the example of FIG. 3. This minimum time offset specified in the first FTM request message transmitted at block 402 is in contrast to providing a specific time (e.g., TSF timer value) after which transmission of the second FTM request message (e.g., FTM message FTM_1 306) may occur. As discussed below, this may reduce or eliminate a need for synchronizing clocks maintained at the initiating STA and the responding STA (e.g., to calibrate a partial TSF timer value provided in a first FTM request message).

At block 502, a responding STA may receive an FTM request message transmitted by an initiating STA at block 402 such as FTM request message 302. At block 504, the responding STA may transmit an initial FTM message, such as FTM message FTM_1 306, in response to receipt of the FTM message.

FIG. 6 illustrates an example of fields for a FTM request message according to an embodiment. Among other fields, FIG. 6 shows an FTM parameters field in an FTM request message (e.g., FTM request message 302 in FIG. 3) which may allow an initiating STA to specify one or more aspects of subsequent FTM message transmissions to be requested of a responding STA. For example, FIG. 7 illustrates an example of fields within an FTM parameters field in a FTM request message (e.g., FTM request message 302 in FIG. 3) according to a particular implementation. For example, fields shown in FIG. 7 may allow an initiating STA to specify aspects of a burst of FTM messages including, for example, a number of bursts, burst duration, burst offset, just to provide a few examples. As pointed out above, an initial FTM message FTM_1 (e.g., initial FTM message FTM_1 306 shown in FIG. 3) may specify alternative action if, for example, a responding STA is not capable of fulfilling the entirety of what the initiating STA requests in the initial FTM request message. In one particular implementation, initial FTM message FTM_1 may specify fields similar to those shown in FIG. 7 to indicate particular parameters under which the responding STA is to schedule actions for satisfying a FTM request message.

As pointed out above, value specified in field Burst Offset in an initial FTM request message transmitted from an initiating STA (as shown in FIG. 7) may specify a minimum time offset between transmission of an initial FTM response message from a responding STA and transmission of a second FTM request message from the initiating STA. As pointed out in the particular embodiment of FIG. 3 above, a responding STA may retransmit initial FTM message FTM_1 until the responding STA receives an acknowledgement of receipt of a last retransmission of the initial FTM message FTM_1. Here, in the particular embodiment of FIG. 3, for example, a value specified in field Burst Offset may indicate a minimum time between transmission of a last transmission of an initial FTM request message FTM_1 for which an acknowledgement message is received at the responding STA. In one example implementation, a period specified by a value in a Burst Offset field may enable the responding STA to allocate resources to tasks in preparation for providing FTM messages in bursts that follow.

In particular implementations, use of the aforementioned Burst Offset field in a FTM request message as illustrated in FIG. 7 may reduce or eliminate any need use of a partial TSF Timer to indicate a particular time that a burst is to commence. Accordingly, there may be no need to provide a value in the Burst Offset field that is synchronized to any particular clock (e.g., synchronized to either a clock at an initiating STA or a clock at a responding STA). In one particular implementation, a value in field Burst Offset may be specified in units of 1.0 ms or TUs (1024 μs).

In a particular implementation, and as shown in the implementation of FIG. 7, an initial FTM request message may comprise a Burst Offset Enable field. Here, the Burst Offset enable field may comprise a single bit and specifying a value in a Burst Offset Enable field may enable flexibility to indicate whether or not a field at Bits 24-39 specifies a value for Burst Offset (e.g., instead of a Partial TSF timer value). In one particular implementation, Bit 7 may specify whether the field Burst Offset is enabled or disabled. For example, if Bit 7 (Burst Offset Enable)=TRUE, Bits 24-39 may specify a value for Burst Offset. On the other hand, if Bit 7=FALSE, Bits 24-39 may specify a value for a Partial TSF Timer.

As pointed out above, an initial FTM message FTM_1 transmitted from a responding STA (e.g., as shown in FIG. 3) may specify fields similar to those shown in FIG. 7 to indicate particular requested parameters under which the responding STA is to schedule actions for satisfying an initial FTM request message. According to an embodiment, an initiating STA may compare alternative parameters (e.g., in an embodiment, parameters may comprise Burst Duration or Min Delta FTM or combination thereof. In an embodiment, other parameters may be compared.) in an initial FTM message FTM_1 with requested parameters provided in a most recently transmitted FTM request message (e.g., with a most recently transmitted initial FTM request message). Here, if the compared parameters match or are acceptable to the initiating STA, the initiating STA may wait until the specified period for Burst Offset expires and transmit an FTM request message to initiate transmission of FTM messages in a burst. Otherwise, if the compared requested and alternative parameters do not match and are not acceptable to the initiating STA, the initiating STA may transmit an FTM message with a trigger field (e.g., initial FTM message FTM_1 306 shown in FIG. 6) set to cancel the initial FTM request message. The initiating STA may then transmit a new initial FTM request message to the responding STA with different FTM parameters.

According an embodiment, a responding STA may reject all incoming initial FTM request messages with a trigger field set to true until an existing current initial FTM request message negotiation is complete or has failed/been cancelled. Here, negotiation of an existing current initial FTM request message may be deemed complete when an initiating STA responds with an ACK message to an initial FTM message FTM_1. In the absence of receipt of an ACK message to an initial FTM message FTM_1, a responding STA. If an initial FTM message FTM_1 is not subsequently acknowledged, then the initial FTM message FTM_1 may be retransmitted with a different dialogue token to indicate negotiation failure via the Status Indication field (b0-b1) in the FTM Parameters IE. This is repeated a finite number of times after which the responding STA deems it a failure and stops.

In another particular embodiment, following transmission of an acknowledgement message by an initiating STA in response to receipt of an initial FTM message FTM_1, the initiating STA may transition to a reduced power state (e.g., sleep state). The initiating STA may then transition from the reduced power state to a full power state prior to end of a minimum time offset specified in a Burst Offset field.

Figure 8:
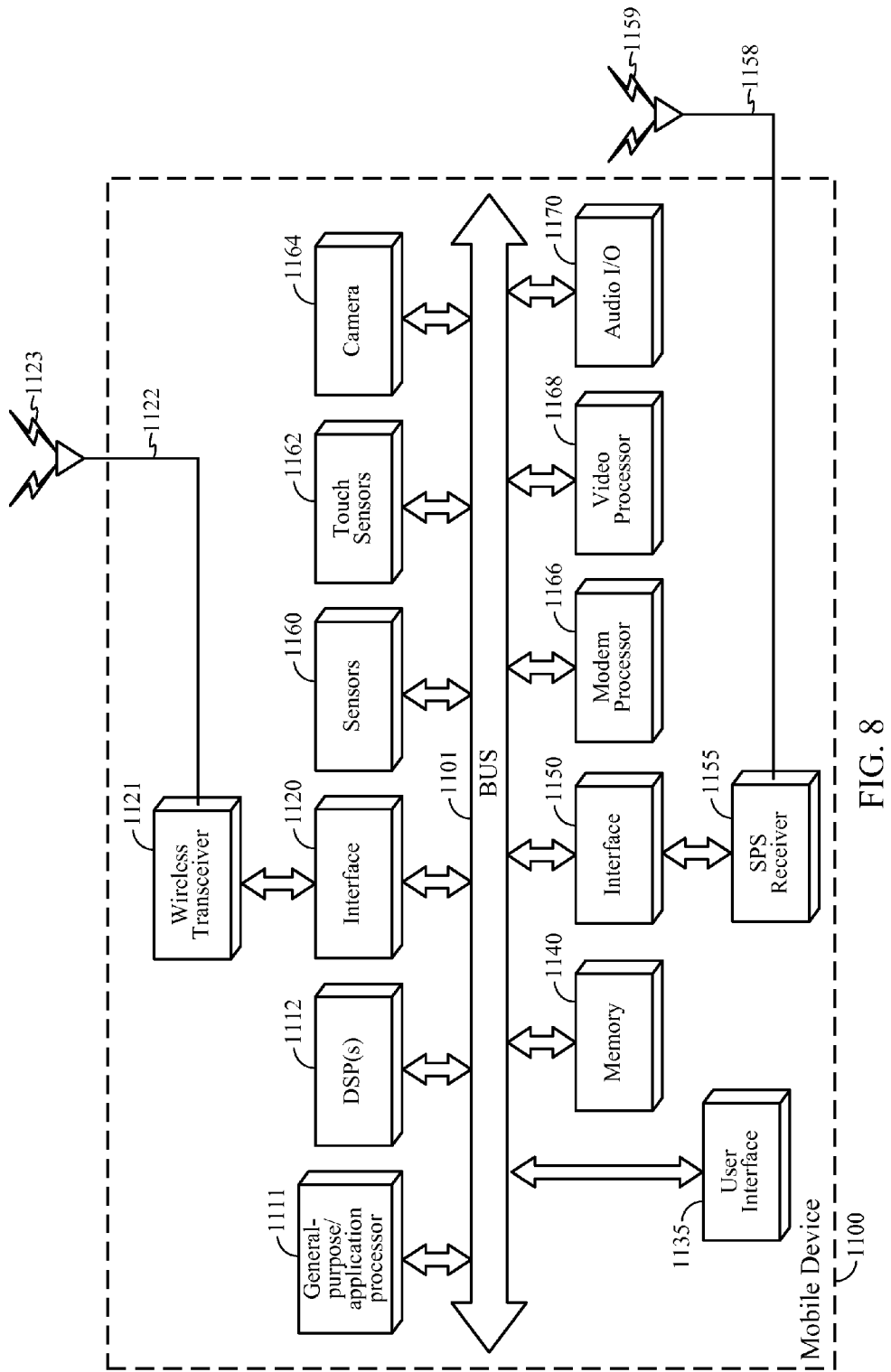
FIG. 8 is a schematic block diagram illustrating an exemplary device, in accordance with an implementation.

FIG. 8 is a schematic diagram of a mobile device according to an embodiment. Mobile device 100 (FIG. 1) may comprise one or more features of mobile device 1100 shown in FIG. 8. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Figure 9:
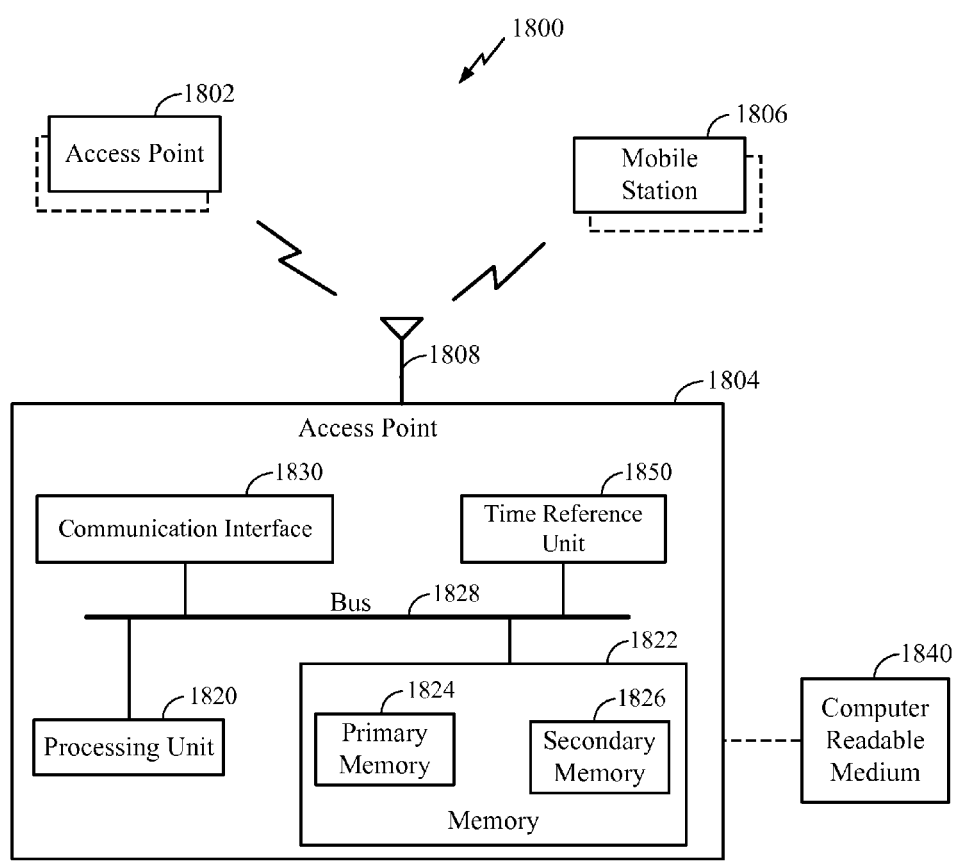
FIG. 9 is a schematic block diagram of an example computing system in accordance with an implementation.

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 3, and 4, or actions depicted in FIG. 5.

In one particular implementation, transmission of an ACK message in response to a FTM measurement request message may be performed by wireless transceiver device 1121 without instruction or initiation from general-purpose processor(s) 1111 or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140). In an embodiment, the messaging in FIGS. 2 and 3 and the methods of FIGS. 4 and 5 may be performed by the apparatus of FIG. 8.

Also shown in FIG. 8, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 9 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 8, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 8, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 8, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/ coupled with processing unit 1820. In a particular implementation, memory 1822 and processing unit 1820 may be configured to execute one or more aspects of process discussed above in connection with FIGS. 4 and 5.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like or combinations thereof. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIG. 2, and FIG. 3, or actions performed in connection with FIGS. 4 and 5.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820). In an embodiment, the messaging in FIGS. 2 and 3 and the methods of FIGS. 4 and 5 may be performed by the apparatus of FIG. 9, for example, by the access point 1804.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At an initiating wireless station (STA), a method comprising:
    transmitting a first fine timing measurement (FTM) request message requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages;
    receiving the initial FTM message transmitted by the responding STA in response to the first FTM request message; and
    transmitting the second FTM request message, the second FTM request message comprising a value in a trigger field to cancel the first FTM request message based, at least in part, on a comparison of one or more first requested parameters in the first FTM request message with one or more alternative parameters in the received initial FTM message.

2. The method of claim 1, and further comprising
    transmitting an acknowledgement message to the responding STA in response to receipt of the initial FTM message; and transitioning to a reduced power state following transmission of the acknowledgement message; and transitioning from the reduced power state to a full power state prior to end of a duration defined, at least in part, by the minimum time offset.

3. The method of claim 1, and further comprising:
computing a time of flight of at least one of FTM message transmitted in the one or more bursts of FTM messages; and measuring a distance between the initiating STA and the responding STA based, at least in part, on the computed time of flight.

4. The method of claim 1, and further comprising:
transmitting the second FTM request message following the minimum time offset based, at least in part, on a comparison of one or more requested parameters in the first FTM request message with one or more alternative parameters in the initial FTM message.

5. The method of claim 1, and further comprising transmitting a third FTM request message to the responding STA comprising one or more second requested parameters.

6. The method of claim 1, wherein the first FTM request message further comprises one or more bits indicating that the at least one field contains the minimum time offset instead of a partial Timing Synchronization Function (TSF) timer indication.

7. An initiating wireless station (STA), comprising:
a receiver to receive messages from a wireless communication network;
a transmitter to transmit messages to the wireless communication network; and
one or more processors configured to:
initiate transmission of a first fine timing measurement (FTM) request message through the transmitter requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages;
obtain the initial FTM message transmitted by the responding STA in response to the first FTM request message received at the receiver; and
initiate transmission of the second FTM request message through the transmitter, the second FTM request message comprising a value in a trigger field to cancel the first FTM request message based, at least in part, on a comparison of one or more first requested parameters in the first FTM request message with one or more alternative parameters in the received initial FTM message.

8. The initiating STA of claim 7, where the one or more processors are further configured to:
initiate transmission of an acknowledgement message through the transmitter to the responding STA in response to receipt of the initial FTM message; and
initiate transition of the initiating STA to a reduced power state following transmission of the acknowledgement message; and
initiate transition of the initiating STA from the reduced power state to a full power state prior to end of a duration defined, at least in part, by the minimum time offset.

9. The initiating STA of claim 7, wherein the one or more processors are further configured to:
compute a time of flight of at least one FTM message transmitted in the one or more bursts of FTM messages; and measure a distance between the initiating STA and the responding STA based, at least in part, on the computed time of flight.

10. The initiating STA of claim 7, wherein the one or more processors are further configured to:
initiate transmission of the second FTM request message through the transmitter following a duration defined, at least in part, by the minimum time offset based, at least in part, on a comparison of one or more requested parameters in the first FTM request message with one or more alternative parameters in the initial FTM message.

11. The initiating STA of claim 7, wherein the one or more processors are further configured to initiate transmission of a third FTM request message through the transmitter to the responding STA, the third FTM request message comprising one or more second requested parameters.

12. The initiating STA of claim 7, wherein the first FTM request message further comprises one or more bits indicating that the at least one field contains the minimum time offset instead of a partial Timing Synchronization Function (TSF) timer indication.

13. A method comprising, at a responding wireless station (STA):
receiving a first fine timing measurement (FTM) request message from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages;
transmitting the initial FTM message in response to the first FTM request message;
in response to receipt of an acknowledgement message transmitted by the initiating STA in response to receipt of the initial FTM message, allocating at least one resource to provide the requested one or more bursts of FTM messages following expiration of a duration defined, at least in part, by the minimum time offset;
re-transmitting the initial FTM message a set number of times responsive to an absence of receipt of the acknowledgement message transmitted by the initiating STA; and
in response to receipt of the acknowledgement message transmitted by the initiating STA in response to receipt of a re-transmission of the initial FTM message, allocating at least one resource to provide the requested one or more bursts of FTM messages following expiration of the duration defined, at least in part, by the minimum time offset.

14. The method of claim 13, and further comprising:
receive the subsequent FTM request message, the subsequent FTM request message comprising a value in a trigger field to cancel the first FTM request message based, at least in part, on a comparison of one or more first requested parameters in the first FTM request message with one or more alternative parameters in the received initial FTM message.

15. The method of claim 13, wherein the first FTM request message further comprises one or more fields comprising one or more first parameters to specify one or more requested aspects of the requested one or more bursts of FTM messages, and wherein the initial FTM message further comprises one or more fields to specify one or more alternative aspects for the requested one or more bursts of FTM messages.

16. The method of claim 15, wherein the one or more requested aspects comprise a number of bursts, burst duration or burst offset, or any combination thereof.

17. A responding wireless station (STA), comprising:
a receiver to receive messages from a wireless communication network;
a transmitter to transmit messages to the wireless communication network; and
one or more processors configured to:
obtain a first fine timing measurement (FTM) request message received at the receiver from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages;
initiate transmission of the initial FTM message through the transmitter in response to the first FTM request message;
in response to receipt of an acknowledgement message transmitted by the initiating STA in response to receipt of the initial FTM message, allocate at least one resource to provide the requested one or more bursts of FTM messages following expiration of a duration defined, at least in part, by the minimum time offset;
initiate re-transmission of the initial FTM message a set number of times responsive to an absence of receipt of the acknowledgement message transmitted by the initiating STA; and
in response to receipt of the acknowledgement message transmitted by the initiating STA in response to receipt of a re-transmission of the initial FTM message, allocate at least one resource to provide the requested one or more bursts of FTM messages following expiration of the duration defined, at least in part, by the minimum time offset.

18. The responding STA of claim 17, wherein the one or more processors are further configured to, receive the subsequent FTM request message from the initiating STA, the subsequent FTM request message comprising a value in a trigger field to cancel the first FTM request message based, at least in part, on a comparison of one or more first requested parameters in the first FTM request message with one or more alternative parameters in the received initial FTM message.

19. The responding STA of claim 17, wherein the first FTM request message further comprises one or more fields comprising one or more first parameters to specify one or more requested aspects of the requested one or more bursts of FTM messages, and wherein the initial FTM message further comprises one or more fields to specify one or more alternative aspects for the requested one or more bursts of FTM messages.

20. The responding STA of claim 19, wherein the one or more requested aspects comprise a number of bursts, burst duration or burst offset, or any combination thereof.

21. A non-transitory storage medium comprising computer readable instructions stored thereon which are executable by one or more processors of an initiating wireless station (STA) to:

initiate transmission of a first fine timing measurement (FTM) request message requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages;
obtaining the initial FTM message received at the initiating STA and transmitted by the responding STA in response to the first FTM request message; and
transmit the second FTM request message, the second FTM request message comprising a value in a trigger field to cancel the first FTM request message based, at least in part, on a comparison of one or more first requested parameters in the first FTM request message with one or more alternative parameters in the received initial FTM message.

22. The storage medium of claim 21, wherein the instructions are further executable by the one or more processors to:
initiate transmission of an acknowledgement message to the responding STA in response to receipt of the initial FTM message;
initiate transition of the initiating STA to a reduced power state following transmission of the acknowledgement message; and
initiate transition of the initiating STA from the reduced power state to a full power state prior to end of a duration defined, at least in part, by the minimum time offset.

23. The storage medium of claim 21, wherein the instructions are further executable by the one or more processors to:
compute a time of flight of at least one of FTM message transmitted in the one or more bursts of FTM messages; and
measure a distance between the initiating STA and the responding STA based, at least in part, on the computed time of flight.

24. An initiating wireless station (STA) comprising:
means for transmitting a first fine timing measurement (FTM) request message requesting one or more bursts of FTM messages from a responding STA, the first FTM request message comprising at least one field specifying a minimum time offset between transmission of an initial FTM message from the responding STA and transmission of a second FTM request message from the initiating STA preceding at least an initial burst of the requested one or more bursts of FTM messages;
means for receiving the initial FTM message transmitted by the responding STA in response to the first FTM request message; and
means for transmitting the second FTM request message, the second FTM request message comprising a value in a trigger field to cancel the first FTM request message based, at least in part, on a comparison of one or more first requested parameters in the first FTM request message with one or more alternative parameters in the received initial FTM message.

25. The initiating STA of claim 24, and further comprising:
means for transmitting an acknowledgement message to the responding STA in response to receipt of the initial FTM message;

means for transitioning to a reduced power state following transmission of the acknowledgement message; and means for transitioning from the reduced power state to a full power state prior to end of a duration defined, at least in part, by the minimum time offset.

26. The initiating STA of claim 24, and further comprising:

means for computing a time of flight of at least one of FTM message transmitted in the one or more bursts of FTM messages; and means for measuring a distance between the initiating STA and the responding STA based, at least in part, on the computed time of flight.

27. A non-transitory storage medium comprising computer readable instructions stored thereon which are executable by one or more processors at a responding wireless station (STA) to:

obtain a first fine timing measurement (FTM) request message received from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages;

initiate transmission of the initial FTM message in response to the first FTM request message;

in response to receipt of an acknowledgement message transmitted by the initiating STA in response to receipt of the initial FTM message, allocate at least one resource to provide the requested one or more bursts of FTM messages following expiration of a duration defined, at least in part, by the minimum time offset;

initiate re-transmission of the initial FTM message a set number of times responsive to an absence of receipt of the acknowledgement message transmitted by the initiating STA; and in response to receipt of the acknowledgement message transmitted by the initiating STA in response to receipt of a re-transmission of the initial FTM message, allocate at least one resource to provide the requested one or more bursts of FTM messages following expiration of the duration defined, at least in part, by the minimum time offset.

28. The storage medium of claim 27, wherein the instructions are further executable by the one or more processors to:

receive the subsequent FTM request message, the subsequent FTM request message comprising a value in a trigger field to cancel the first FTM request message based, at least in part, on a comparison of one or more first requested parameters in the first FTM request message with one or more alternative parameters in the received initial FTM message.

29. A responding wireless station (STA), comprising:

means for receiving a first fine timing measurement (FTM) request message from an initiating STA, the first FTM request message requesting one or more bursts of FTM messages and comprising one or more fields specifying a minimum time offset between transmission of an initial FTM message from the responding STA and transmission of a subsequent FTM request message from the initiating STA preceding at least an initial burst of the requested one or more bursts of FTM messages;

means for transmitting the initial FTM message in response to the first FTM request message;

means, in response to receipt of an acknowledgement message transmitted by the initiating STA in response to receipt of the initial FTM message, for allocating at least one resource to provide the requested one or more bursts of FTM messages following expiration of a duration defined, at least in part, by the minimum time offset;

means for re-transmitting the initial FTM message a set number of times responsive to an absence of receipt of an acknowledgement message transmitted by the initiating STA; and means, in response to receipt of an acknowledgement message transmitted by the initiating STA in response to receipt of a re-transmission of the initial FTM message, allocating at least one resource to provide the requested one or more bursts of FTM messages following expiration of the duration defined, at least in part, by the minimum time offset.

30. The responding STA of claim 29, and further comprising:

means for receiving the subsequent FTM request message, the subsequent FTM request message comprising a value in a trigger field to cancel the first FTM request message based, at least in part, on a comparison of one or more first requested parameters in the first FTM request message with one or more alternative parameters in the received initial FTM message.

* * * * *